United States Patent
Bienenstein, Jr.

[11] Patent Number: 6,155,624
[45] Date of Patent: Dec. 5, 2000

[54] WHEEL WELL LINER FOR A MOTOR VEHICLE AND RELATED METHOD

[75] Inventor: Charles A. Bienenstein, Jr., Chesterfield, Mich.

[73] Assignee: DaimlerChrysler Corporation, Auburn Hills, Mich.

[21] Appl. No.: 09/307,618

[22] Filed: May 7, 1999

[51] Int. Cl.$^7$ .................................................. B60R 5/60
[52] U.S. Cl. ........................ 296/37.1; 296/198; 280/847; 280/851
[58] Field of Search .................................. 280/847, 848, 280/152.5, 154, 851; 296/198, 37.1, 197, 1, 100

[56] References Cited

U.S. PATENT DOCUMENTS

| | | | |
|---|---|---|---|
| 4,131,308 | 12/1978 | Holka et al. | 296/1 |
| 4,199,188 | 4/1980 | Albrecht et al. | 296/100 |
| 4,236,746 | 12/1980 | LaVoie | 296/1 |
| 4,291,912 | 9/1981 | Fox et al. | 296/1 |
| 4,422,685 | 12/1983 | Bonfilio et al. | 296/197 |
| 4,440,438 | 4/1984 | Miyoshi et al. | 296/198 |
| 4,462,632 | 7/1984 | Grassl | 296/198 |
| 4,687,217 | 8/1987 | Stewart | 280/848 |
| 4,706,981 | 11/1987 | Dorwart | 280/851 |
| 4,735,427 | 4/1988 | Fuchs | 280/847 |
| 5,462,331 | 10/1995 | Stief et al. | 296/198 |
| 5,613,710 | 3/1997 | Waner | 280/848 |
| 5,899,500 | 5/1999 | Benvenuto | 280/851 |

OTHER PUBLICATIONS

1999 Ram Truck 1500–3500 Service Manual, pp. 23–29.

*Primary Examiner*—Joseph D. Pape
*Assistant Examiner*—Kiran Patel
*Attorney, Agent, or Firm*—Marc Lorelli

[57] ABSTRACT

A wheel well liner for a motor vehicle includes a first portion and a second portion. The first and second portions are connected by a living hinge. Preferably, the wheel liner is injection molded to include the first portion, the second portion and the living hinge.

14 Claims, 4 Drawing Sheets

WHEEL WELL LINER FOR A MOTOR VEHICLE AND RELATED METHOD

BACKGROUND OF THE INVENTION

1. Technical Field

The present invention generally pertains to motor vehicles. More particular, the present invention pertains to a wheel well liner for a motor vehicle. More specifically, but without restriction to the particular embodiment and/or use which is shown and described for purposes of illustration, the present invention relates to a wheel liner including a living hinge and a related method of manufacturing the wheel liner.

2. Discussion

Many modern vehicles incorporate a liner on an inner side of the wheel wells. Such wheel well liners function to prevent moisture and debris from entering the vehicle. Most commonly, conventional wheel well liners are injection molded of a thermoplastic material.

Known wheel well liners have proven to adequately prevent moisture and debris from entering an associated motor vehicle. However, wheel well liners are associated with significant manufacturing and assembly drawbacks. Such manufacturing drawbacks will be discussed with reference to the prior art view of FIG. 3A which illustrates a simplified side view of a conventional wheel well liner A shown relative to a mold chord axis X and mold pull axis Y. The pull axis Y represents the direction of relative travel between die halves when the conventional wheel well liner A is removed from a mold. The chord axis X is oriented perpendicular to the pull axis Y. Typically, the chord axis X intersects portions of the mold which form distal ends of the wheel well liner A so as to reduce a maximum chord length Z extending between the chord axis X and the outer surface of the wheel well liner and oriented perpendicular to the chord axis X.

A thermoplastic material is introduced into the cavity defined by the die halves at one or more positions. The height of the conventional mold for the wheel well liner requires a significant amount of metal which greatly increase tool cost. Furthermore, flow problems have been encountered in the formation of the distal ends of the conventional wheel well due to significant heat loss in the distal ends. As a result additional material is included in the wheel well liner which could otherwise be eliminated and therefore provide a reduction in material cost and part weight.

Another significant drawback associated with the manufacture of conventional wheel well liners relates to the incorporation of mounting apertures into the wheel well liners. As is known by those skilled in the art, it is desirable that all areas of the wheel well liner be open to draw upon completion of the injection molding. It is known to core mounting apertures in an injection molded product, such as a wheel well liner, with either fixed pins or mechanical slides.

The fixed pins are relatively inexpensive to incorporate but are required to be oriented parallel with the pull axis. As a result, fixed pins are typically not suitable for coring apertures through a thin walled part, such as a wheel well liner at a minimum effective angle of less than approximately 30°. Preferably, the effective angle between the fixed pin and the thin walled surface to be cored with the pin is approximately 45° or greater. Where cored apertures cannot be manufactured with fixed pins, it is known to incorporate mechanical slides. Mechanical slides increase manufacturing complexity and expenses significantly.

With respect to assembly drawbacks, the conventional wheel well liners are often difficult to insert within a vehicle wheel well.

Accordingly, a need remains in the art for a wheel well liner and a method for manufacturing a wheel well liner which overcome the disadvantages associated with the prior art.

SUMMARY OF THE INVENTION

It is a general object of the present invention to provide an improved wheel well liner and related method of manufacture which overcome the disadvantages associated with the prior art, including but not limited to those disadvantages specifically discussed above.

It is another object of the present invention to provide a wheel well liner for a motor vehicle including a living hinge which allows for articulation of a first portion relative to a second portion to facilitate vehicle assembly.

It is another object of the present invention to provide a method of manufacturing a wheel well liner for a motor vehicle which reduces manufacturing complexities and expenses.

It is another object of the present invention to provide a method for manufacturing a wheel well liner for a motor vehicle which reduces or eliminates mechanical slides for coring holes in the wheel well liner during an injection molding procedure.

It is another object of the present invention to provide an improved method of manufacturing a wheel well liner for a motor vehicle which reduces the chord length.

It is another object of the present invention to provide an improved method of manufacturing a wheel well liner for a motor vehicle which improves the flow of a thermoplastic material to the distal ends of a mold cavity during an injection molding procedure.

It is a more particular object of the present invention to provide an improved method of manufacturing a wheel well liner for a motor vehicle which molds in a living hinge.

It is a related object of the present invention to provide a method of manufacturing a wheel well liner for a motor vehicle in which all areas of the wheel well liner are open to draw during an injection molding procedure.

In one form, the present invention provides a wheel well liner for a motor vehicle. The wheel well liner includes a first portion and a second portion. The first and second portions are connected by a living hinge. Preferably, the wheel well liner is injection molded to integrally include the first portion, the second portion and the living hinge.

In another form, the present invention provides a method of manufacturing a wheel well liner for a motor vehicle including a first portion and a second portion. The first and second portions cooperate to line an inner surface of a wheel well of the motor vehicle. The method includes the general steps of providing a mold including first and second die halves which cooperate to define a female cavity complimentary to the wheel well liner, and injection molding the wheel well liner to include a living hinge connecting the first portion and the second portion. The living hinge is operative in an open position and a closed position.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
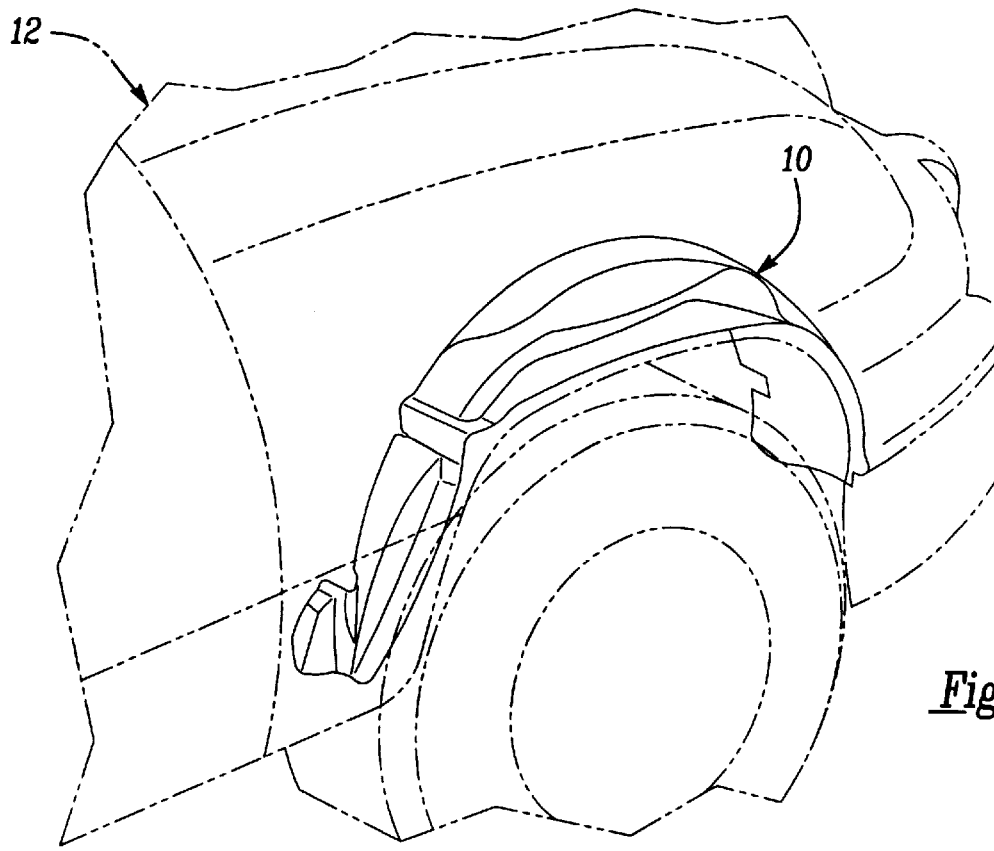
FIG. 1 is a perspective view of a portion of a motor vehicle including a wheel well liner constructed in accordance with the teachings of a preferred embodiment of the present invention.
Figure 2:
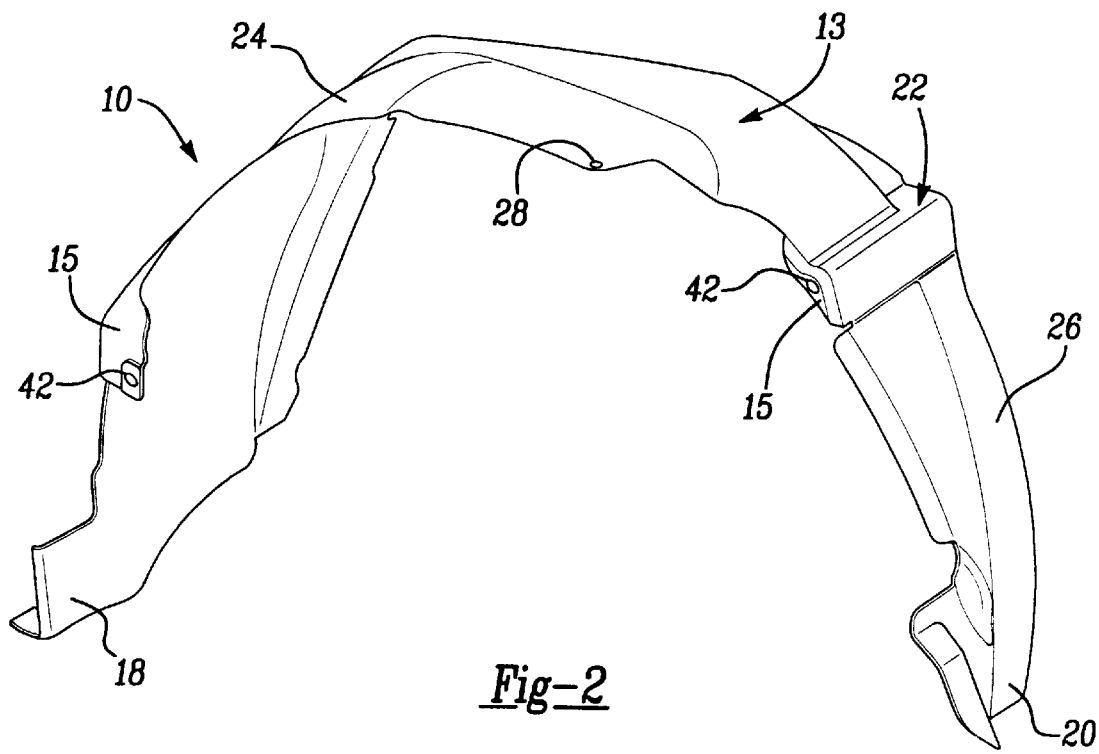
FIG. 2 is a perspective view of the wheel well liner of FIG. 1 shown removed from the portion of the motor vehicle for purposes of illustration.

With initial reference to the environmental view of FIG. 1, a wheel well liner constructed in accordance with the teachings of the preferred embodiment of the present invention is generally identified at reference numeral 10. The wheel well liner is shown operatively associated with a portion of an exemplary motor vehicle 12. The portion of the vehicle 12 is illustrated to generally include a front fascia and defines a right front wheel well. Throughout the drawings, the wheel well liner 10 shown is specifically intended for this exemplary application. However, it will be readily appreciated that the teachings of the present invention are equally applicable for other vehicles. Further in this regard, it will be understood that a mirror image of the wheel well liner 10 is suitable for lining a left front wheel well (not shown) of the motor vehicle.

The construction of the wheel well liner 10 of the present invention will be further detailed with continued reference to FIG. 1 and additional reference to FIGS. 2, 4–6 and 8. The wheel well liner 10 includes a main body portion 13 and a pair of mounting flanges 15 which radially extend inwardly from the main body portion 13. In side elevation view, the main body portion 13 of the wheel well liner 10 has an overall generally arcuate shape. The arcuate shape is configured for attachment to an inner surface of a vehicle wheel well. While the curvature of the wheel well 10 is not constant, the arcuate shape of the wheel well 10 generally conforms to a half circle. The wheel well 10 terminates downwardly at a first distal end or rear distal end 18 and a second distal end or forward distal ends 20.

The wheel well liner 10 is preferably constructed to include a living hinge 22 which connects a first portion or rear portion 24 with a second portion or forward portion 26. The living hinge 22 is operative in an open position (shown in FIG. 3B), a neutral position (shown in FIG. 2, for example) and a closed position (shown in FIG. 8). Incorporation of the living hinge 22 provides several advantages for manufacturing the wheel well liner 10 and attachment of the wheel well liner 10 to the vehicle 12 during final vehicle assembly. These advantages will be discussed further below.

Considering the wheel well liner 10 to generally define a half circle, the rear portion 24 extends through approximately 130°. Accordingly, the forward portion 26 extends through approximately 50°. The living hinge 22 effectively provides a transversely extending pivot axis about which the first and second portions 24 and 26 may relatively articulate. It will be appreciated by those skilled in the art that the specific location of the living hinge 22 shown in the drawings is merely exemplary. In this regard, the living hinge 22 may be located at alternative points along the longitudinally extending arc defined by the wheel well liner 10. Furthermore, it will be understood that additional living hinges (not shown) may be incorporated for particular alternative applications.

With the living hinge 22 articulated to its neutral position, the wheel well liner has a first maximum height perpendicular to a line connecting the first and second distal ends 18 and 20 of the wheel well liner 10. When the living hinge 22 is articulated to its open position, the wheel well liner 10 includes a second maximum height perpendicular to the line connecting the first and second distal ends. The first maximum height is greater than the second maximum height. The reduced maximum height with the living hinge 22 in its open position provides significant manufacturing advantages which will be addressed below.

Figure 5:
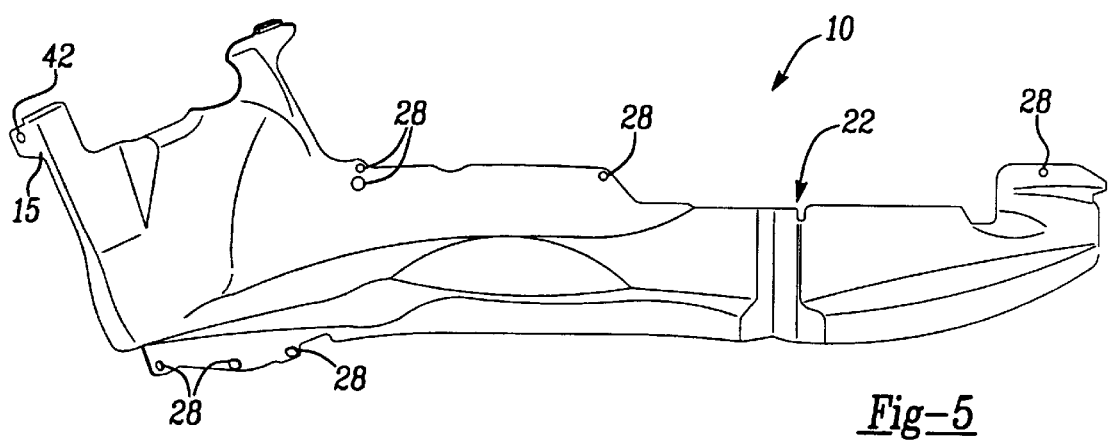
FIG. 5 is a view of the wheel well liner of the present invention taken in the direction of arrow 5 in FIG. 3B.
Figure 6:
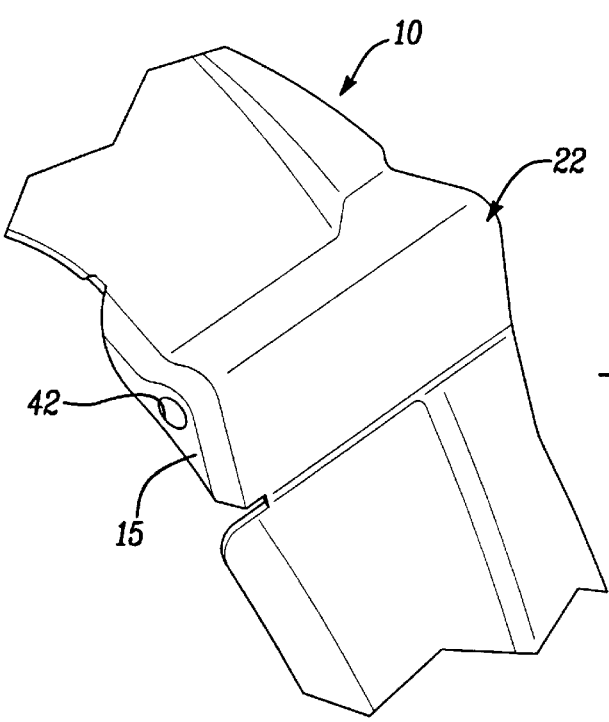
FIG. 6 is an enlarged perspective of a portion of the wheel well liner of the present invention further illustrating the living hinge.

With particular reference to FIG. 5, the wheel well liner 10 of the present invention is illustrated to include a plurality of mounting apertures 28 provided in the main body portion 13 for securing the wheel well liner 10 to the motor vehicle 10. Alternatively, it will be understood that in certain applications it may be desirable to eliminate the mounting apertures 28 in favor of attachment of the main body portion 13 to the motor vehicle 12 with self-tapping screws, push pins or rivets. In the exemplary embodiment, the mounting apertures 28 in the main body portion 13 are cored during an injection molding process. The specific manner of coring the mounting apertures 28 will be discussed in detail below.

Figure 3A:
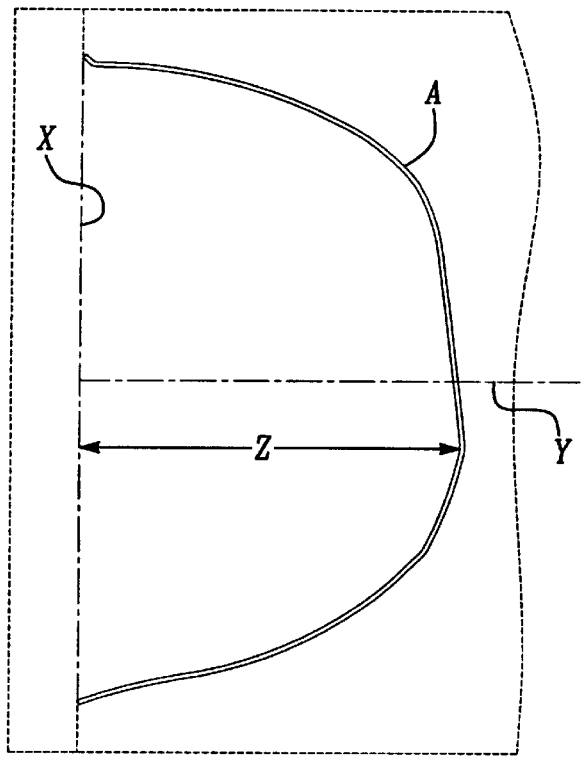
FIG. 3A is a simplified side view of a prior art wheel well liner shown operatively positioned between first and second die halves of an injection mold.
Figure 3B:
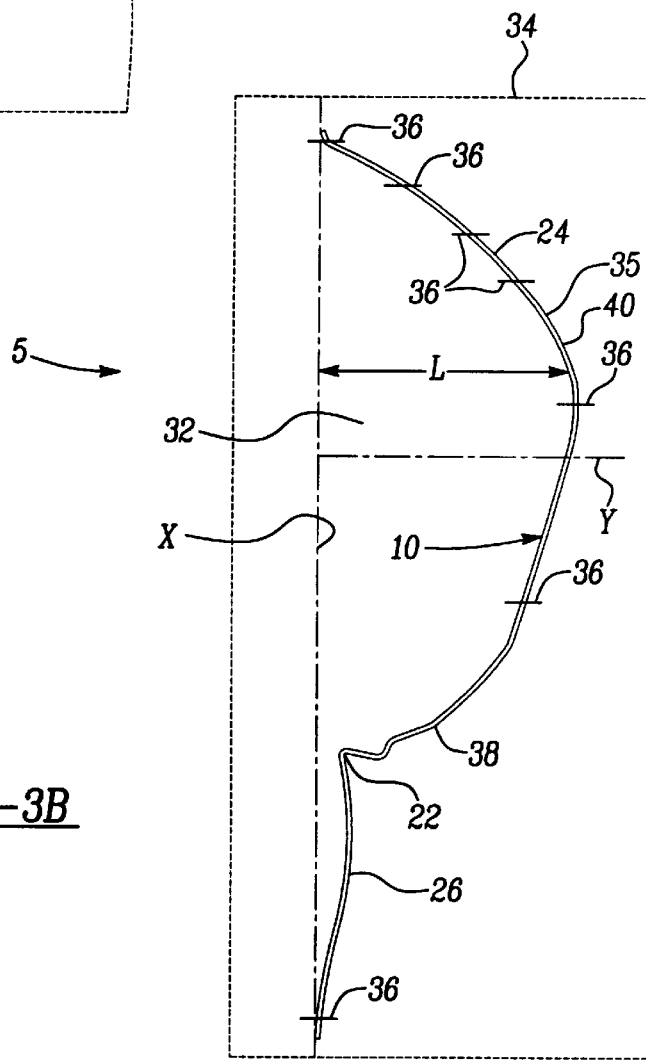
FIG. 3B is a simplified side view similar to FIG. 3A illustrating a simplified side view of the wheel well liner of the present invention shown operatively positioned between first and second die halves of an injection mold.
Figure 4:
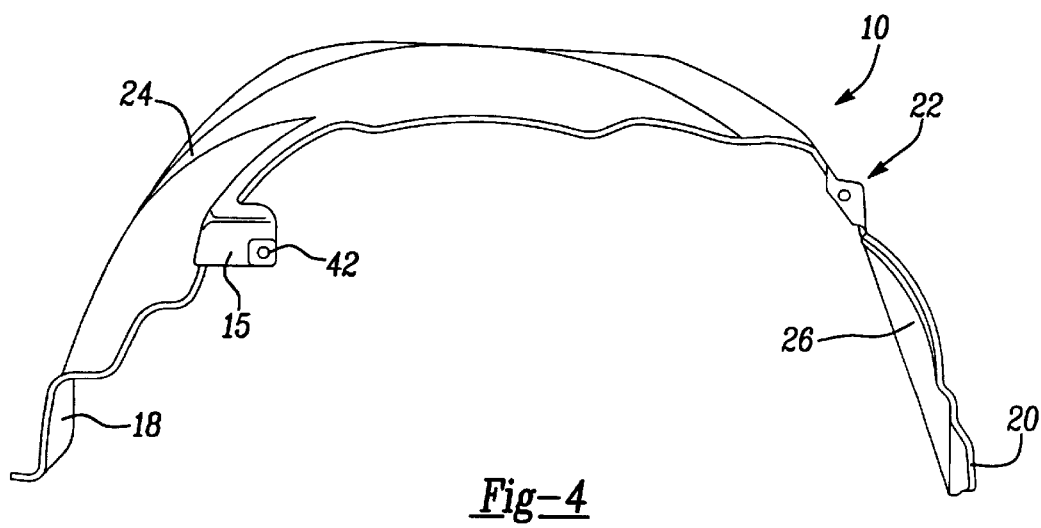
FIG. 4 is an enlarged side view of the wheel well liner of the present invention shown in an outboard direction.

With particular reference to the simplified view of FIG. 3B, the wheel well liner 10 of the present invention is shown operatively positioned between first and second die halves 30 and 32 of an injection mold 34. The first and second die halves 30 and 32 cooperate to define a female die cavity 35 complimentary to the wheel well liner 10. It will be understood that the first die half 30 is conventionally adapted to move relative to the second die half 32 along a pull axis Y as the mold is opened and closed. A chord axis X is defined normal to the pull axis Y. In the exemplary embodiment, the portions of the female cavity 35 which form the distal ends 18 and 20 of the wheel well liner 10 intersect the chord axis X. In the preferred embodiment, the wheel well liner 10 is injection molded with the living hinge 22 in its open position.

A plurality of pins 36 are carried by the second die half 32 for coring the mounting apertures 28. In the exemplary embodiment, the mold 34 includes seven pins 36 for coring a corresponding number of mounting apertures 28 in the main body 13 of the wheel well liner 10. By injection molding the wheel well liner 10 with the living hinge 22 in its open position, the fixed pins 36 can be used to core apertures 28 in surfaces of the main body portion 13 which would otherwise not be accessible with fixed pins 36. In other words, expensive mechanical slides or other devices would have to be used for the coring of at least some of the mounting apertures 28.

A thermoplastic material is injected into the female cavity 35 at two points 38 and 40. In one application, the thermoplastic material is polyethylene. However, other suitable materials can be alternatively used.

As it is being molded, the wheel well liner 10 has a maximum chord length L, the perpendicular distance from the chord axis X to an outer surface of the main body 13, having a first dimension. A conventional wheel well liner 10 without the living hinge 22 but otherwise having an identical size and shape, includes a maximum chord Z (see FIG. 3A) with a second dimension. The second dimension is significantly longer than the first dimension.

The shorter chord length L of the wheel well liner 10 of the present invention provides several advantages. In this regard, the mold 34 can be shortened, thereby reducing the metal required for the mold 34 and reducing heat loss during injection molding. By reducing heat loss, flow of the thermoplastic material is improved. With this improved flow, the wheel well liner 10 can be easily manufactured with a reduced nominal thickness. In one application, the nominal thickness is approximately 2.5 mm. Reduction of the nominal thickness correspondingly reduces required material and part weight.

In certain applications, it may be desired to provide the mounting flanges 15 of the wheel well liner 10 with additional mounting apertures 42. These mounting apertures are formed in surfaces (i.e., the mounting flanges 15) that are perpendicular to the pull axis Y. As a result, mechanical slides may be required for coring these apertures 42.

The wheel well liner 10 is shipped to a vehicle assembly plant boxed along with other similar liners 10. During shipment, the wheel well liners 10 are maintained with the living hinges 22 in their open positions. This increases the number of wheel well liners 10 per container.

Figure 8:
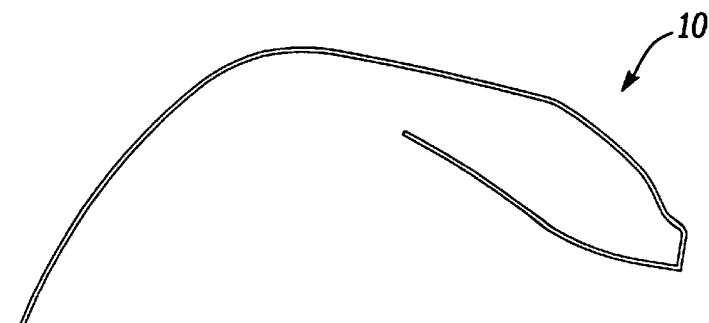
FIG. 8 is a simplified side view of the wheel well liner of the present invention shown articulated to pre-installation position.

At the time of installation, the living hinge 22 is articulated to a closed or pre-installation position (shown in FIG. 8). In this position, the forward portion 26 of the wheel well liner 10 articulates inwardly and the overall dimensions of the wheel well liner 10 are reduced. At this point, the wheel well liner 10 can be more easily introduced into the vehicle wheel well. Once inside the wheel well, the living hinge 22 is articulated back to its neutral position and the liner 10 is conventionally fastened to the vehicle 12 with fasteners that pass through the mounting apertures 28.

Figure 7:
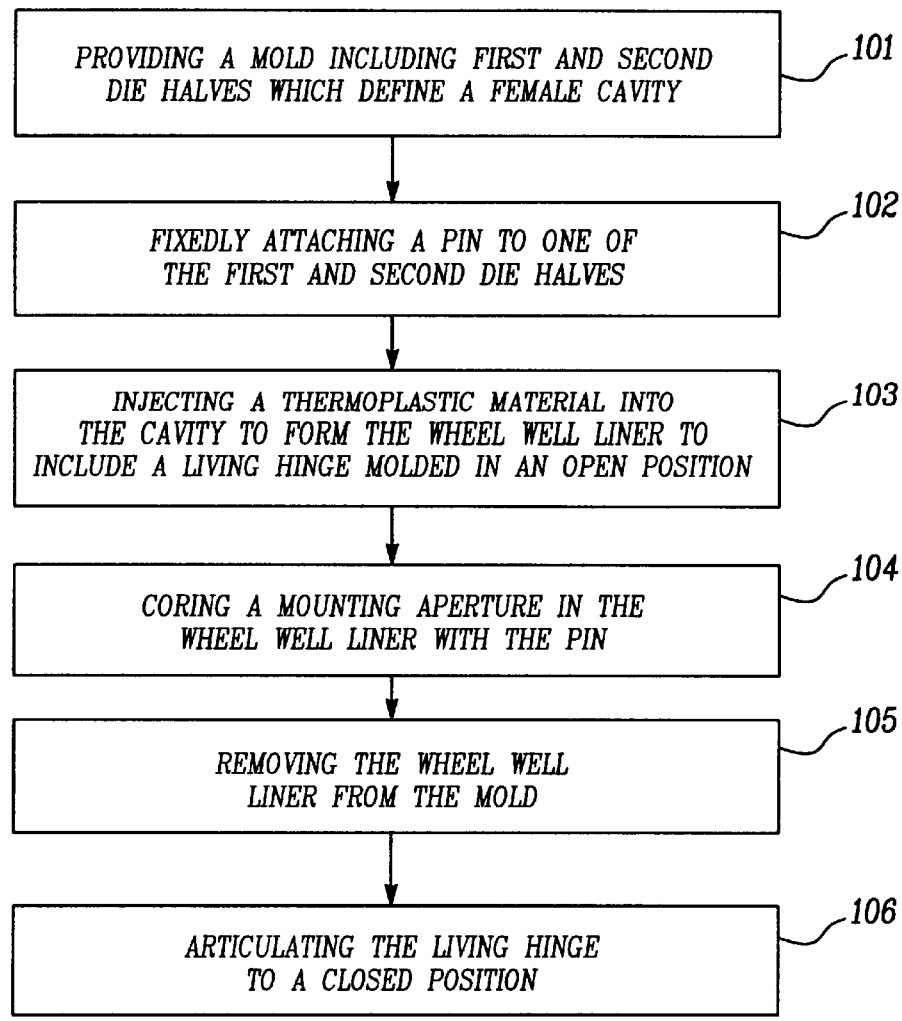
FIG. 7 is a flow diagram illustrating the general steps of a preferred method of the present invention.

With continued reference to the previously discussed drawings and additional reference to the flow diagram of FIG. 7, a preferred method of the present invention will now be described. In a first general step 101, the method of the present invention provides a mold 34 including first and second die halves 30 and 32 which define a female cavity 35.

In a second general step 102, the method of the present invention fixedly attaches a pin 36 to one of the first and second die halves 30 and 32.

In a third general step 103, the method of the present invention injects a thermoplastic material into the cavity 35 to form the wheel well liner 10 to include a living hinge 22 molded in an open position.

In a fourth general step 104, the method of the present invention cores a mounting aperture 28 in the wheel well liner 10 with the pin 36.

In a fifth general step 105, the method of the present invention removes the wheel well liner 10 from the mold 34.

In a sixth general step 106, the method of the present invention articulates the living hinge 22 to a closed position.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A wheel well liner for a motor vehicle, the wheel well liner comprising:

a first portion;

a second portion; and a living hinge connecting said first portion and said second portion, the living hinge being positioned between the first and second portions to permit the wheel well liner to be formed with a chord length that is smaller than a maximum chord length of the wheel well liner.

2. The wheel well liner for a motor vehicle of claim 1, wherein the wheel well liner is injection molded to include said first portion, said second portion and said living hinge.

3. The wheel well liner for a motor vehicle of claim 1, wherein said first portion extends in a longitudinal direction, said second portion extends in said longitudinal direction, and said living hinge permits pivoting of said first portion relative to said second portion about a transversely extending axis.

4. The wheel well liner for a motor vehicle of claim 1, wherein said first portion includes a plurality of cored apertures extending through said first portion.

5. The wheel well liner for a motor vehicle of claim 1, wherein said living hinge is operable in an open position and a neutral position, the wheel well liner having a generally half circle shape when said living hinge is in said neutral position.

6. The wheel well liner for a motor vehicle of claim 5, wherein the wheel well liner includes first and second distal ends, and further wherein the wheel well liner includes a first maximum height perpendicular to a line connecting said first and second distal ends when said living hinge is in said neutral position and the wheel well liner includes a second maximum height perpendicular to the line connecting said first and second distal ends when said living hinge is in said open position, said first maximum height being greater than said second maximum height.

7. The wheel well liner for a motor vehicle of claim 1, wherein said first portion is arcuate.

8. A method of manufacturing a wheel well liner for a motor vehicle including a first portion and a second portion which cooperate to line an inner surface of a wheel well of the motor vehicle, the method comprising: providing a mold including first and second die halves which cooperate to define a female cavity complimentary to the wheel well liner; and injecting a thermoplastic material into said cavity to form the wheel well liner to include a living hinge connecting the first portion and the second portion, said living hinge operative in an open position and a neutral position, said wheel well liner being formed with the living hinge in the open position to thereby permit the wheel well liner to be formed in the cavity with a chord length that is smaller than a maximum chord length of the wheel well liner.

9. The method of manufacturing a wheel well liner for a motor vehicle of claim 7, wherein said step of injecting a thermoplastic material into said cavity to form the wheel well liner to include a living hinge includes the step of injection molding the living hinge in the open position.

10. The method of manufacturing a wheel well liner for a motor vehicle of claim 8, wherein said step of injecting a thermoplastic material into said cavity to form the wheel well liner to include a living hinge further includes the steps of:

defining a chord axis; and separating said first and second die halves by translating one of said die halves along a pull axis normal to said chord axis.

11. The method of manufacturing a wheel well liner for a motor vehicle of claim 10, wherein the step of coring at least one mounting aperture in the wheel well liner includes the steps of:

providing a fixed pin attached to one of said first and second halves and extending parallel to said pull axis; and coring said at least one mounting aperture with said fixed pin.

12. A method of manufacturing a wheel well liner for a motor vehicle including a first portion and a second portion which cooperate to line an inner surface of a wheel well of the motor vehicle, the method comprising:

providing a mold including first and second die halves which cooperate to define a female cavity;

fixedly attaching a pin to one of the first and second die halves;

injecting a thermoplastic material into said cavity to form the wheel well to include a living hinge molded in an open position;

coring a mounting aperture in the wheel well with said pin;

removing the wheel well from the mold; and articulating the living hinge to a neutral position;

the wheel well liner having a maximum height perpendicular to a line connecting a first distal end of the wheel well liner and a second distal end of the wheel well liner, said maximum height having a first dimension when said living hinge is in said neutral position and a second dimension when said living hinge is in said open position, said first dimension being greater than said second dimension.

13. The method of manufacturing a wheel well liner for a motor vehicle of claim 12, wherein said step of injection molding the wheel well liner to include a living hinge includes the step of injection molding the living hinge in the open position.

14. The method of manufacturing a wheel well liner for a motor vehicle of claim 13, wherein said step of injection molding the wheel well liner to include a living hinge further includes the steps of:

defining a chord axis interconnecting a first distal end of the wheel well liner and a second distal end of the wheel well liner; and separating said first and second die halves by translating on of said die halves along a pull axis normal to said chord axis.

* * * * *